United States Patent [19]
Harrison

[11] Patent Number: 6,075,662
[45] Date of Patent: Jun. 13, 2000

[54] MULTICHANNEL AUDIO RECORDING METHOD AND APPARATUS

[75] Inventor: Simon Irving Harrison, Witney, United Kingdom

[73] Assignees: Sony Corporation, Tokyo, Japan; Sony United Kingdom Limited, Weybridge, United Kingdom

[21] Appl. No.: 08/947,365

[22] Filed: Oct. 8, 1997

[30] Foreign Application Priority Data

Dec. 20, 1996 [GB] United Kingdom .................. 9626590

[51] Int. Cl.[7] .................................................. G11B 27/02
[52] U.S. Cl. ............................ 360/13; 369/4; 369/83; 381/119; 381/107; 360/68
[58] Field of Search .......................... 369/4, 83; 381/119, 381/107, 108, 120, 121; 360/13, 55, 67, 68, 18

[56] References Cited

U.S. PATENT DOCUMENTS 5,257,317  10/1993  Stavrou .................................. 381/119
5,652,800   7/1997  Roberts .................................. 381/119

*Primary Examiner*—Alan T. Faber
*Attorney, Agent, or Firm*—Frommer Lawrence & Haug, LLP; William S. Frommer

[57] ABSTRACT

Audio recording apparatus comprises a multichannel audio recorder in which recording channels are selectable between a recording mode and a non-recording mode; and a gain controller for altering the level of an audio signal for recording on all recording channels currently in the recording mode, in dependence on the number of recording channels of the multichannel audio recorder in the recording mode.

8 Claims, 1 Drawing Sheet

MULTICHANNEL AUDIO RECORDING METHOD AND APPARATUS

BACKGROUND OF THE INVENTION

1. Field of the Invention

This invention relates to audio recording.

2. Description of the Prior Art

In an audio recording studio where artists' audio signals are recorded on a multitrack tape recorder, the studio engineer is generally in a different room to the artists. He can talk to the artists via studio loudspeakers or headphones using a so-called "talk-back" facility.

The so-called "slate" function refers to the opportunity for the studio engineer to record messages on the multi-track recorder. For example, the message might indicate the date or "take" number for the performance to be recorded. These messages are taken from the talkback signal originated at the talkback microphone, and are recorded on all tracks of the tape recorder which are currently in a recording mode.

SUMMARY OF THE INVENTION

This invention provides audio recording apparatus comprising:

a multichannel audio recorder in which recording channels are selectable between a recording mode and a non-recording mode; and a gain controller for altering the level of an audio signal for recording on all recording channels currently in the recording mode, in dependence on the number of recording channels of the multichannel audio recorder in the recording mode.

The invention recognises and addresses the problem in previous recording systems in which a "slate" signal is recorded on those tape tracks currently in a recording mode, that on replay of all tracks of the multitrack tape recorder, the volume of the replayed slate signal varies in dependence on the number of tracks on which the slate signal was recorded.

For example, the replayed slate signal will be very loud if (at the time of recording) it was recorded on all tracks of the multitrack recorder, but very faint if it was recorded on only one track.

The invention addresses this problem by altering the level of the slate signal in dependence on the number of recording channels of the recorder in the recording mode.

For example, to obtain substantially the same output slate signal regardless of the number of tracks on which the slate signal was recorded, the gain controller can operate to alter the level of the audio signal by a factor linearly related to the number of recording channels in the recording mode. This can conveniently be achieved by employing a counter responsive to tally signals generated by the multichannel audio recorder indicating whether respective recording channels are in the recording mode, for detecting the number of recording channels in the recording mode.

Preferably the gain controller comprises: a signal divider for dividing a representation of the audio signal by a division gain control factor proportional to the number of recording channels in the recording mode; a detector for detecting whether no recording channels are currently in the recording mode; and means for setting the gain control factor to a non-zero value in the case that no recording channels are currently in the recording mode. This feature avoids potential division by zero problems in the operation of the gain controller.

This invention also provides audio recording control apparatus for controlling a multichannel audio recorder in which recording channels are selectable between a recording mode and a non-recording mode; the apparatus comprising:

a gain controller for altering the level of an audio signal for recording on all recording channels currently in the recording mode, in dependence on the number of recording channels of the multichannel audio recorder in the recording mode.

Apparatus according to the invention is particularly useful as part of an audio mixing console.

The invention also provides a method of controlling a multichannel audio recorder in which recording channels are selectable between a recording mode and a non-recording mode; the method comprising the step of:

altering the level of an audio signal for recording on all recording channels currently in the recording mode, in dependence on the number of recording channels of the multichannel audio recorder in the recording mode.

BRIEF DESCRIPTION OF THE DRAWINGS

The above and other objects, features and advantages of the invention will be apparent from the following detailed description of illustrative embodiments which is to be read in connection with the accompanying drawing, in which.

DESCRIPTION OF THE PREFERRED EMBODIMENTS

Figure 1:
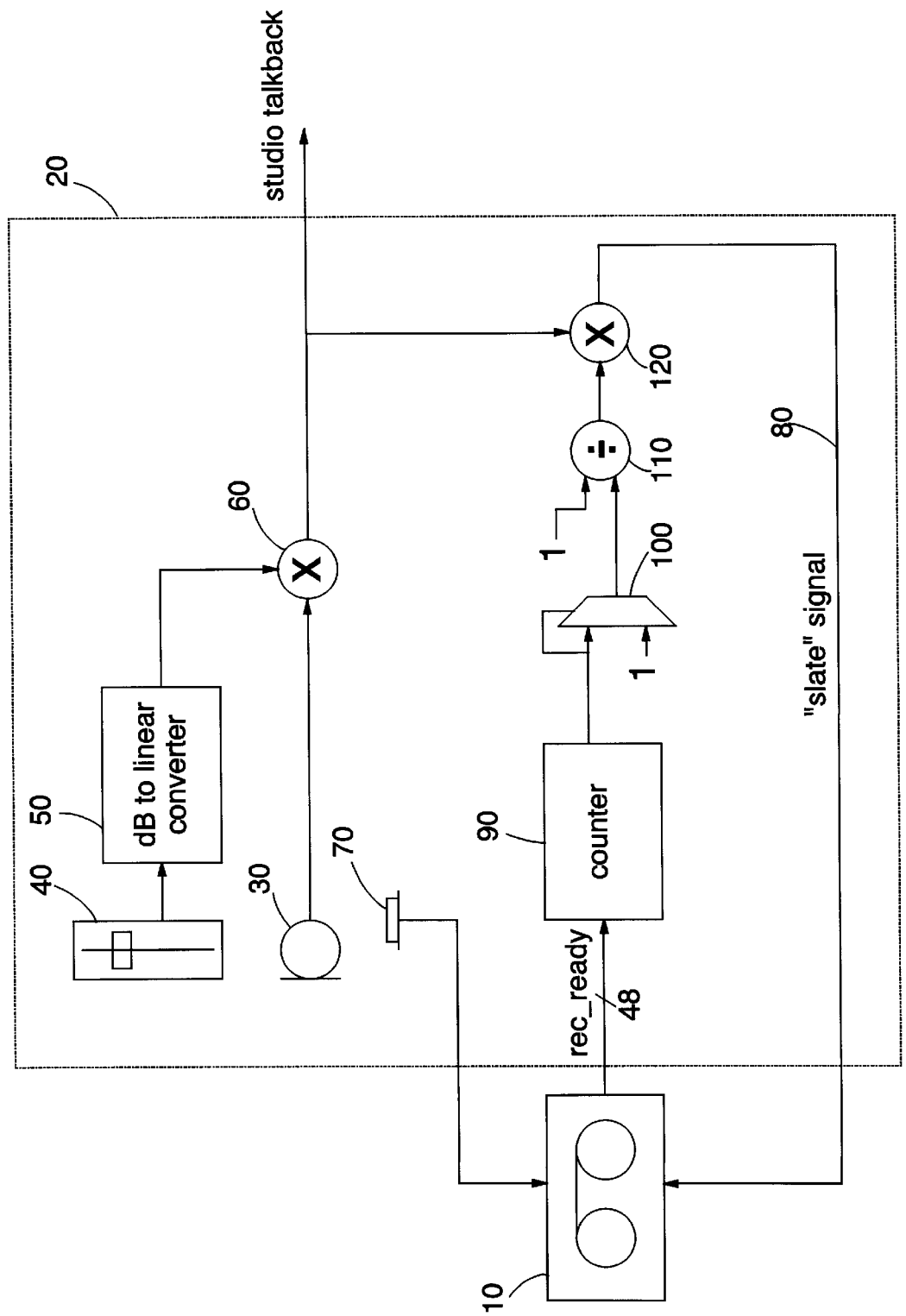
FIG. 1 is a schematic diagram of part of an audio mixing console connected to a multitrack audio recorder.

Referring to the drawing, a 48-track tape recorder 10 (such as a Sony PCM-3348 tape recorder) is connected to an audio mixing console 20. Only some components of the audio mixing console 20 are shown in FIG. 1.

(In other embodiments the whole of the apparatus of FIG. 1 could instead form a single recording system).

In the example of FIG. 1, the audio mixing console is set up for use in a studio recording situation. Audio signals generated in the studio (e.g. from microphones, electronic instruments or guitar pickups) are received by the audio mixing console and recorded on the multi-track recorder 10. During recording or on replay, the relative levels of the different tracks recorded on the multi-track tape recorder 10, and their equalisation, can be adjusted using the controls of the audio mixing console 20. This aspect of the operation of the audio mixing console 20 is conventional and has not been illustrated in FIG. 1.

The aspect of the audio mixing console 20 which is illustrated in FIG. 1 is the so-called "talkback" and "slate" function.

"Talkback" allows the operator of the audio mixing console 20, who is generally in a control room acoustically isolated from the studio, to talk to artists in the studio. In particular, the operator talks into a talkback microphone 30 located on or near the console, and adjusts the level of the talkback audio signal using a fader 40. The talkback signal is then supplied to loudspeakers or headphones in the studio.

The console shown in FIG. 1 is a digital audio mixing console operating on digital representations of audio signals, although the techniques described would work equally well with an analogue console.

In the digital console the way in which the level of the talkback signal is adjusted is by converting a position of the fader 40 (representing a gain in decibels (dB)) to a linear multiplication coefficient in a converter 50, and then multiplying sample values of the audio signal from the microphone 30 (suitably converted to a digital signal by an analogue-to-digital converter—not shown) by the multiplication coefficient in a multiplier 60.

The "slate" function refers to the opportunity for the console operator to record messages on the multi-track recorder 10. For example, the message might indicate the date or "take" number for the performance to be recorded.

These messages are taken from the talkback signal originated at the talkback microphone 30.

The multi-track tape recorder 10 is capable of recording 48 audio channels or tracks in parallel. However, each track is individually selectable to be in a recording mode ("rec_ready") or a non-recording mode. When a channel is in the rec_ready mode, it is literally ready for recording. A single record control (e.g. a button to be pressed by the operator) will then set all channels in the rec_ready mode to actual recording.

In the case of a slate function, it is desirable to record the slate signal onto any and all channels which are in the rec_ready mode. When a slate button 70 is pressed, the slate signal 80 is recorded on the multi-track recorder.

The multi-track recorder 10 generates so-called rec_tallies, which are signals indicative of whether a respective one of the 48 tracks is in the rec_ready mode. The number of such tallies which are in the rec_ready mode is detected by a counter 90 which outputs the number (between 0 and 48) of channels in the rec_ready mode.

The output from the counter 90 is supplied to a multiplexer 100 arranged to pass either the value generated by the counter 90, if that value is between 1 and 48, or a constant value of 1 if the number generated by the counter 90 is in fact zero. This avoids divide-by-zero errors later.

The number output by the multiplexer 100, which is now between 1 and 48, is supplied to a divider 110 where the reciprocal of that number is generated. The reciprocal value is then supplied to a multiplier 120 where it is multiplied by the talkback signal to generate the slate signal 80.

So, the signal level of the slate signal sent to tape is varied in inverse proportion to the number of tracks currently in the recording or "rec_ready" mode. For example, if 12 tracks are in the rec_ready mode, then all things being equal the slate signal level sent to each track is twice as high as it would be if 24 tracks were in the recording mode.

So, on subsequent replay of all 48 tracks, the replayed slate signal has a similar level regardless of how many tracks were in the recording mode.

Although illustrative embodiments of the invention have been described in detail herein with reference to the accompanying drawing, it is to be understood that the invention is not limited to those precise embodiments, and that various changes and modifications can be effected therein by one skilled in the art without departing from the scope and spirit of the invention as defined by the appended claims.

I claim:

1. Audio recording apparatus comprising:

a multichannel audio recorder in which recording channels are selectable between a recording mode and a non-recording mode, in which a number (N) of the recording channels are in the recording mode; and a gain controller for altering a level of an audio signal for recording on all of the recording channels currently in said recording mode in accordance with the number N.

2. Apparatus according to claim 1, further comprising a recording activation control for initiating recording operation by those recording channels of said multichannel audio recorder which are currently in said recording mode.

3. Apparatus according to claim 1, further comprising a counter responsive to tally signals generated by said multichannel audio recorder indicating whether respective recording channels are in said recording mode, for detecting the number N;

said gain controller being operable to alter said level of said audio signal by a factor linearly related to the number N.

4. Apparatus according to claim 3, in which said gain controller comprises:

(i) a signal divider for dividing a representation of said audio signal by a division gain control factor proportional to the number of recording channels in said recording mode;

(ii) a detector for detecting whether no recording channels are currently in said recording mode; and (iii) means for setting said gain control factor to a non-zero value in the case that no recording channels are currently in said recording mode.

5. An audio mixing console comprising apparatus according to claim 1.

6. Audio recording control apparatus for controlling a multichannel audio recorder in which recording channels are selectable between a recording mode and a non-recording mode, in which a number (N) of the recording channels are in the recording mode; said apparatus comprising:

a gain controller for altering the level of an audio signal for recording on all recording channels currently in said recording mode in accordance with the number N.

7. An audio mixing console comprising apparatus according to claim 6.

8. A method of controlling a multichannel audio recorder in which recording channels are selectable between a recording mode and a non-recording mode, in which a number (N) of the recording channels are in the recording mode; said method comprising the step of:

altering the level of an audio signal for recording on all recording channels currently in said recording mode in accordance with the number N.

* * * * *